United States Patent [19]

Geissler et al.

[11] Patent Number: 5,089,286
[45] Date of Patent: Feb. 18, 1992

[54] APPLIANCE FOR SPIRALLY SLICING FRUITS AND VEGETABLES

[75] Inventor: Richard L. Geissler, Chippewa Falls; Rodger L. Kelly, Eau-Claire, both of Wis.

[73] Assignee: National Presto Industries, Inc., Eau Claire, Wis.

[21] Appl. No.: 555,042

[22] Filed: Jul. 18, 1990

[51] Int. Cl.$^5$ .................. A47J 17/00; A23L 1/212; A23P 1/00

[52] U.S. Cl. .................. 426/615; 83/672; 83/733; 83/862; 99/537; 99/538; 99/584; 99/595; 426/512; 426/518

[58] Field of Search ............... 99/485, 495, 537, 538, 99/539, 567, 584, 592, 594, 595; 83/865, 862, 56, 431, 733, 672; 426/615, 637, 512, 518

[56] References Cited

U.S. PATENT DOCUMENTS

| | | |
|---|---|---|
| 2,156,645 | 5/1939 | Waller . |
| 2,464,993 | 3/1949 | Ross . |
| 2,489,581 | 11/1949 | Mason . |
| 2,508,868 | 5/1950 | Ross . |
| 2,715,927 | 8/1955 | Cüpper . |
| 3,058,149 | 10/1962 | Schmid et al. ................... 99/593 |
| 3,159,195 | 12/1964 | Loveland . |
| 3,162,225 | 12/1964 | Loveland . |
| 3,164,183 | 1/1965 | Kirkpatrick . |
| 3,211,202 | 10/1965 | Mason . |
| 3,285,388 | 11/1966 | Armstrong . |
| 3,310,084 | 3/1967 | Anderson et al. . |
| 3,357,469 | 12/1967 | Pease et al. . |
| 3,434,517 | 3/1969 | Durand, Jr. et al. . |
| 3,452,794 | 7/1969 | Cooke et al. . |
| 3,607,316 | 9/1971 | Hume . |
| 3,610,303 | 10/1971 | Loveland . |
| 3,696,847 | 10/1972 | Erekson et al. . |
| 3,874,259 | 4/1975 | Chambos et al. . |
| 3,952,621 | 4/1976 | Chambos . |
| 4,216,712 | 8/1980 | Altman . |
| 4,363,266 | 12/1982 | Tichy et al. . |
| 4,387,111 | 6/1983 | Müllender . |
| 4,457,222 | 7/1984 | Finkel ................... 99/494 |
| 4,619,192 | 10/1986 | Cycyk et al. ................... 99/595 |
| 4,628,808 | 12/1986 | Simon ................... 99/593 |
| 4,704,959 | 11/1987 | Scallen ................... 99/538 |
| 4,738,195 | 4/1988 | Berude et al. ................... 99/590 |
| 4,765,234 | 8/1988 | Cailliot . |
| 4,787,305 | 11/1988 | Akesson . |
| 4,926,726 | 5/1990 | Julian . |

FOREIGN PATENT DOCUMENTS

| | | |
|---|---|---|
| 1024046 | 1/1978 | Canada . |
| 1225910 | 8/1987 | Canada . |
| 3046923 | 7/1982 | Fed. Rep. of Germany . |
| 3708265 | 9/1988 | Fed. Rep. of Germany . |
| 575059 | 7/1924 | France . |
| 21138 | of 1893 | United Kingdom . |

OTHER PUBLICATIONS

Copy of International Search Report, 7/1991.
NORPRO® Document, Entitled, "Coily-Q Potato Cutter for Spiraled French Fried Potatos", 2 pages. (Exhibit A), date unknown.
Twelve Photographs of a Device Labelled, "White Mountain" and Apple Parer Corer Slicer (Exhibit AA), date unknown.
NEMCO Spiral Fry TM, publication, 2 pages, Labelled Exhibit AB, date unknown.
Six Photographs of a Product Labelled NEMCO, date unknown.

Primary Examiner—Timothy F. Simone
Attorney, Agent, or Firm—Merchant, Gould, Smith, Edell, Welter & Schmidt

[57] ABSTRACT

An electrical appliance for slicing a fruit or vegetable into spiral segments which includes (i) a frame which defines a retention compartment, (ii) a container configured for telescoping reception within the frame which defines a retention chamber, (iii) a means for rotating produce contained within the retention compartment of the frame, and (iv) a blade assembly across the base of the container operable for slicing the produce contained within the retention compartment when the container is telescopingly inserted within the frame and the produce is rotated by the rotating means.

15 Claims, 4 Drawing Sheets

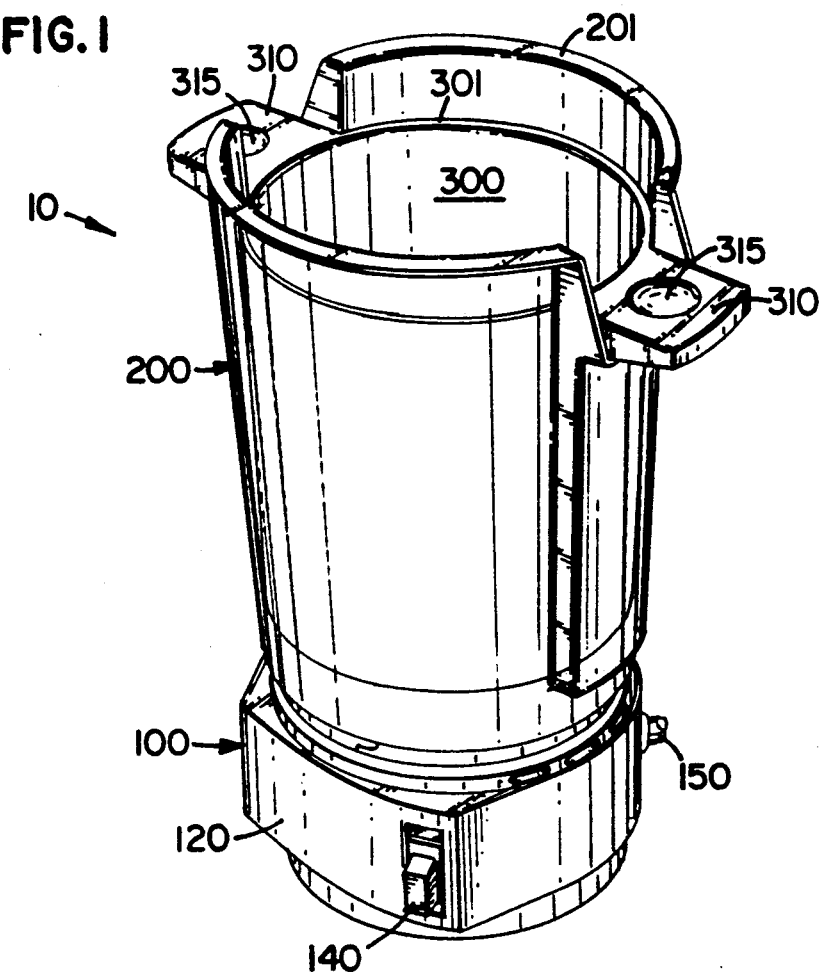
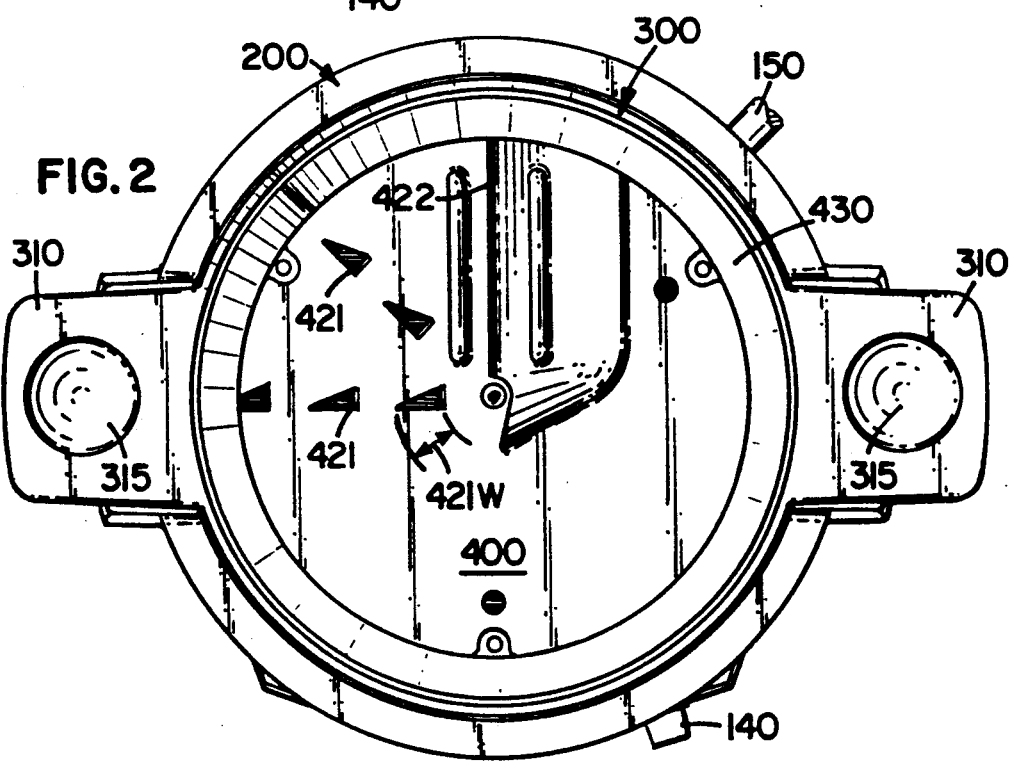

APPLIANCE FOR SPIRALLY SLICING FRUITS AND VEGETABLES

FIELD OF THE INVENTION

Broadly, the invention relates to devices for slicing fruits and/or vegetables. Specifically, the invention relates to appliances useful for quickly and efficiently slicing a fruit or vegetable into helical segments.

BACKGROUND OF THE INVENTION

The spiral slicing of fruits and vegetables such as apples, eggplant, onions, peppers, potatoes, radishes, tomatoes, and the like is known to produce an aesthetically pleasing product. Generically, fruits and vegetables are sliced into spiral segments by rotating and advancing a fruit/vegetable against a blade.

Samson et al., Canadian Patent Number 1,225,910, describes an apparatus for helically cutting potatoes which includes a rotating blade assembly (74), a plurality of inwardly biased fingers (63) for retaining a potato above the rotating blade assembly, and a plunger (47) for forcing the potato retained by the fingers against the blade assembly.

Chambos et al., U.S. Pat. No. 3,874,259 (Canadian Patent Number 1,024,046) describes an apparatus for helically cutting potatoes which includes a portable power drill (2) slidably mounted upon a base for engaging a stationary blade assembly (31) positioned at one end of the base. In operation, a potato is rotatably supported between a set of prongs (34) retained within the collar of the drill and an axial pin (33) extending from the center of the blade assembly and the potato rotated and advanced towards the stationary blade assembly by the power drill.

Ross, U.S. Pat. No. 2,508,868, describes a hand operable utensil for helically cutting vegetables which includes a base with a shaft (14) threadably engaged at one end and a blade assembly (30) engaged to the base unit at the other end. In operation a potato is supported on the distal end of the shaft and rotated against the blade assembly by rotation of the shaft.

German Patents Numbers 3,046,923 and 3,708,264 describe hand operable utensils for spirally cutting fruits and vegetables. The utensils include a shank threaded along the distal end for producing an axial advance into a fruit/vegetable and a blade extending transversely from the shank for cutting the fruit/vegetable as the utensil progresses through the fruit/vegetable.

Mullender, U.S. Pat. No. 4,387,111, describes a method of spirally slicing a potato by simply rotating the potato against a tensioned wire(s).

Cupper et al., U.S. Pat. No. 2,715,927, describes an appliance for dicing onions which includes a rotatable blade assembly (2) and an independently rotatable hopper (7) above the blade assembly. Operation of the appliance includes the steps of (i) placing an onion in the hopper, (ii) rotating the blade assembly against the lower surface of the onion so as to score the onion in a first direction, (iii) rotating the hopper so as to lift and rotate the onion 90° with respect to the blade assembly, (iv) continuing rotation of the blade assembly to score the onion in a second direction transverse to the first direction, and then (v) removing the twice scored portion of the onion with a horizontal blade.

While generally effective for helically slicing fruits and/or vegetables, previous devices such as those summarized above are awkward, cumbersome, messy, and/or expensive to manufacture.

Accordingly, a need exists for an appliance which can quickly, easily, cleanly and efficiently slice fruits and vegetables into spiral segments.

SUMMARY OF THE INVENTION

I have discovered an appliance which can quickly, easily, cleanly and efficiently slice a fruit or vegetable into spiral segments. Broadly, the appliance includes (i) a frame accessible through the top which defines a retention compartment, (ii) a container configured for telescoping reception within the frame through the top of the frame which defines a retention chamber, (iii) a means for rotating produce contained within the retention compartment of the frame, and (iv) a blade assembly operably coupled to the container for slicing the produce contained within the retention compartment of the frame when the container is telescopingly inserted within the frame and the produce is rotated by the rotating means.

The appliance is configured such that the produce passes from the retention compartment of the frame through the base of the container and into the retention chamber defined by the container. The sliced produce in the container may then be easily removed from the apparatus along with the container.

The appliance permits slicing of produce by simply (i) rotating a vertically mounted article of produce about a vertical axis, (ii) slicing the rotating article of produce from top to bottom in a downwardly spiralling fashion, and (iii) directing the sliced produce into a container positioned immediately above the rotating article of produce as the article of produce is being sliced.

BRIEF DESCRIPTION OF THE DRAWINGS

FIG. 1 is a perspective view of one embodiment of the invention.

FIG. 2 is an perspective view of the invention embodiment depicted in FIG. 1.

DETAILED DESCRIPTION OF THE INVENTION INCLUDING A BEST MODE

Figure 3:
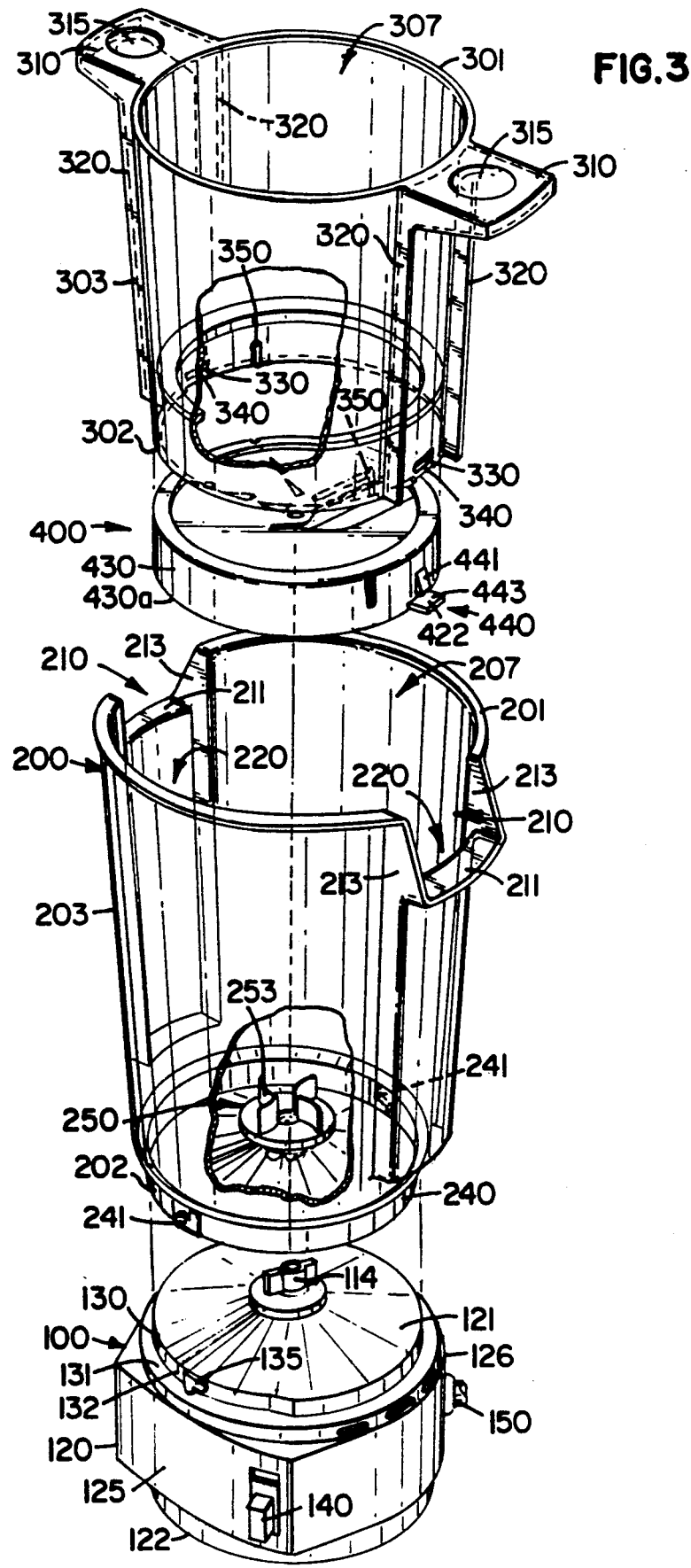
FIG. 3 is a front cross-sectional view of the invention embodiment depicted in FIG. 1
Figure 4:
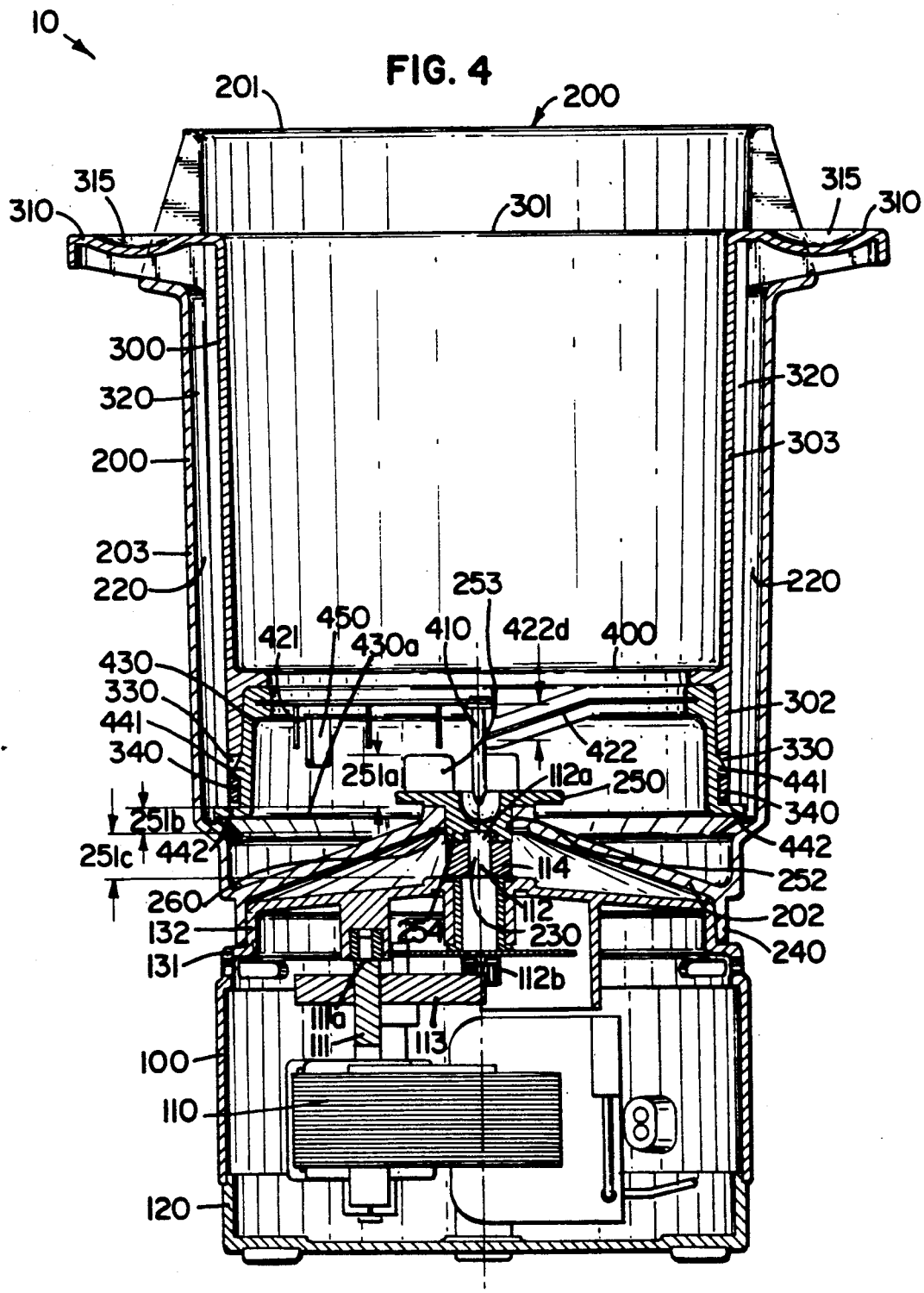
FIG. 4 is an top view of the invention embodiment depicted in FIG. 1
Figure 5:
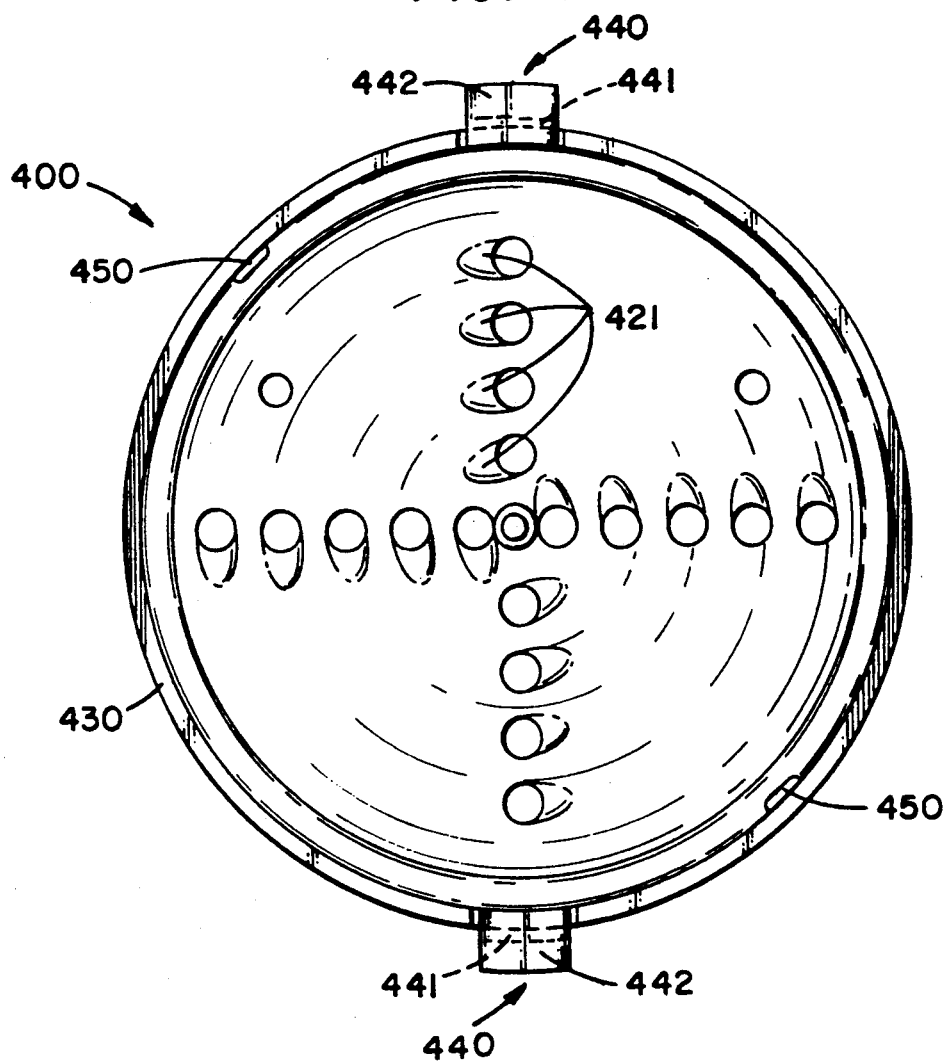
FIG. 5 is a top view of an alternative blade assembly for use in the invention which would grate a fruit or vegetable.

| Nomenclature | |
|---|---|
| 10 | appliance |
| 100 | motorized base |
| 110 | electric motor |
| 111 | motor shaft |
| 111a | distal end of motor shaft |
| 112 | drive shaft |
| 112a | distal end of drive shaft |
| 112b | proximal end of drive shaft |
| 113 | gear train |
| 114 | drive lug arrangement |
| 120 | housing |
| 121 | top of housing |
| 122 | bottom of housing |
| 125 | front of housing |
| 126 | back of housing |
| 130 | peripheral shoulder |
| 131 | horizontal portion of peripheral shoulder |
| 132 | vertical portion of peripheral shoulder |
| 135 | L-shaped projection |

-continued

| Nomenclature | |
|---|---|
| 140 | switch |
| 150 | cord |
| 200 | sleeve |
| 201 | top of sleeve |
| 202 | bottom of sleeve |
| 203 | sidewall of sleeve |
| 207 | retention compartment defined by sleeve |
| 210 | notches |
| 211 | bottom flange about notches |
| 213 | side flanges about notches |
| 220 | longitudinal channels |
| 230 | central orifice through bottom of sleeve |
| 240 | peripheral collar along bottom of sleeve |
| 241 | L-shaped channel |
| 250 | drive disc |
| 251a | upper portion of drive disc |
| 251b | central portion of drive disc |
| 251c | lower portion of drive disc |
| 252 | annular channel in central portion of drive disc |
| 253 | upwardly extending skewers on disc drive |
| 254 | downwardly extending tines on disc drive |
| 260 | retaining ring |
| 300 | hopper |
| 301 | top of hopper |
| 302 | bottom of hopper |
| 303 | sidewall of hopper |
| 307 | chamber defined by hopper |
| 310 | laterally extending tabs |
| 315 | depression in tabs |
| 320 | longitudinal ribs |
| 330 | slots |
| 340 | block between slot and bottom of hopper |
| 350 | guiding fingers |
| 400 | blade assembly |
| 410 | centering pin |
| 421 | longitudinal blades |
| 421w | linear distance between longitudinal blades |
| 422 | transverse blade |
| 422d | depth of transverse blade |
| 430 | holding collar |
| 430a | distal end of tabs |
| 440 | locking arrangement |
| 441 | sloped projection |
| 552 | squared projection |
| 443 | channel on tabs |
| 450 | guiding slots |
| 500 | potato |
| 500' | sliced potato segments |
| 501 | top of potato |
| 502 | bottom of potato |

CONSTRUCTION

Without intending to limit the scope of the invention, construction and operation of the invention shall be described with respect to the spiral slicing of a potato to produce curly potato segments which may then be deep-fat fried to produce curly french fries.

The appliance 10 has four separate components: (i) a base 100, (ii) a sleeve 200, (iii) a hopper 300, and (iv) a blade assembly 400.

The base includes an electric motor 110 surrounded by a housing 120. The housing 120 is generally shaped as a right circular cylinder with an on/off switch 140 protruding from the front 125 of the housing 120 and an electrical cord 150 projecting through the back 126 of the housing 120. The bottom 122 of the housing 120 is provided with four pads 160 for stabilizing the appliance 10 on smooth surfaces such as a counter top (not shown).

The top 101 of the motorized base 100 is configured to define a peripheral shoulder 130 which includes a horizontal portion 131 and a vertical portion 132. A pair of diametrically opposed, upside down, L-shaped projections 135 extend outwardly from the vertical portion 132 of the peripheral shoulder 130 for retainably engaging the bottom 202 of the sleeve 200 in order to prevent rotation of the sleeve 200.

A central drive shaft 112 extends upward through the top 121 of the housing 120. The central drive shaft 112 is rotated by the motor shaft 111 through a gear train 113 which connects the distal end 111a of the motor shaft 111 to the proximal end 112b of the drive shaft 112. A drive lug arrangement 114 is provided at the distal end 112a of the drive shaft 112 operable for engaging a drive disc 250 rotatably retained within the bottom 202 of the sleeve 200 and transferring rotational power from the drive shaft 112 to the drive disc 250.

The sleeve 200 is substantially cylindrical and defines a retention compartment 207 which is accessible through the top 201 of the sleeve 200. A vertically extending, peripheral collar 240 is configured along the bottom 202 of the sleeve 200 for engaging the peripheral shoulder 130 on the base housing 120.

The sleeve 200 connects the hopper 300 to the base 100 so as to prevent rotation of the hopper 300 relative to the drive shaft 112 and serves to contain splattering of juices from the potato 500.

A pair of diametrically opposed, generally L-shaped channels 241 are provided along the inner surface of the peripheral collar 240. The channels 241 are configured for engaging the L-shaped projections 115 on the base housing 120 and secure the sleeve 200 to the base 100 and prevent rotation of the sleeve 200.

The bottom 202 of the sleeve 200 is upwardly concave to provide spacing between the top 121 of the base housing 120 and the bottom 202 of the sleeve 200 for accommodating the drive shaft 112.

A pair of diametrically opposed, substantially square notches 210 are provided at the top of the sleeve side wall 203 for accommodating a pair of tabs 310 extending from the hopper 300 when the hopper 300 is inserted within the sleeve 200. A bottom flange 211 and pair of side flanges 213 are provided about the notches 210 for providing enlarged bearing surfaces for contacting the lateral tabs 310 on the hopper 300.

Extending downward from each of the notches 210 along substantially the entire length of the sleeve sidewall 203 is an inwardly open longitudinal channel 220. The longitudinal channels 220 are operable for accepting a pair of outwardly extending, diametrically opposed, longitudinal rib pairs 320 along the hopper sidewall 303 for preventing rotation of the hopper 300 relative to the sleeve 200 when any portion of the hopper 300 is placed within the sleeve 200.

The sleeve 200 includes a central orifice 230 in the bottom 202 of the sleeve 200 through which a drive disc 250 is rotatably secured by a retaining ring 260. An upper portion 251a of the drive disc 250 extends into the retention compartment 207 of the sleeve 200 while a lower portion 251c of the drive disc 250 extends into the cavity defined by the concave bottom 202 of the sleeve 200. The retaining ring 260 is secured within an annular channel 252 in the central portion 251b of the drive disc 250.

The lower portion 251c of the drive disc 250 has four peripherally spaced, downwardly projecting skewers 254 for engaging the drive lug arrangement 114 extending from the drive shaft 112 so as to transmit rotational energy from the drive shaft 112 to the drive disc 250.

The upper portion 251a of the drive disc 250 has four peripherally spaced, inwardly curved and upwardly projecting skewers 253 for penetrating into the bottom 502 of a potato 500 and thereby causing transference of rotational power from the drive shaft 112 to a potato 500 through the drive disc 250.

The hopper 300 is configured for telescoping reception within the retention compartment 207 of the sleeve 200 and defines a chamber 307 which is accessible through the top 301 of the hopper 300. The bottom 302 of the hopper 300 is defined by a blade assembly 400 which includes downwardly extending blades 421,422 for slicing a potato 500 and a downwardly extending centering pin 410 for skewering the top 501 of a potato 500 in order to maintaining proper orientation of the potato 500 with respect to the blades 421,422 during slicing. Potato segments 500′ produced by rotating a potato 500 against the blades 421,422 pass through the blade assembly 400 and are retained within the chamber 307 defined by the hopper 300.

A pair of diametrically opposed lateral tabs 310 extend outwardly from the top 301 of the hopper 300. The tabs 310 are configured and arranged so that the tabs 310 correspond with the notches 210 in the sleeve 200 for securing of the tabs 310 within the notches 210 when the hopper 300 is substantially completely within the retention compartment 207 of the sleeve 200. Downwardly concave depressions 315 are provided in each of the lateral tabs 310 for accommodating the thumbs (not shown) of a user during operation of the appliance 10.

Diametrically opposed longitudinal rib pairs 320 extend outwardly from the sidewall 303 of the hopper 300 from each of the tabs 310 to the bottom 302 of the hopper 300. The individual ribs in each rib pair 320 are configured and arranged in cooperation with the longitudinal channel 220 in the sleeve 200 such that the rib pairs 320 may be longitudinal slid within the longitudinal channels 220 for preventing rotational movement of the hopper 300 relative to the sleeve 200.

The sidewall 303 of the hopper 300 has a pair of diametrically opposed slots 330 proximate the bottom 302 of the hopper 300 for accepting a laterally extending projection 441 on the blade assembly 400 and thereby securing the blade assembly 400 to the hopper 300.

The blade assembly 400 includes 5 longitudinal blades 421 for slicing a rotating potato 500 into strips from the center of the potato 500 toward the periphery of the potato 500 and a single transverse blade 422 for cutting the potato 500 from top 501 to bottom 502 after the longitudinal blades 421 have cut the potato 500 into strips. The blades 421,422 are secured within a holding collar 430.

The blade assembly 400 includes a pair of diametrically opposed locking arrangements 440 which extend laterally from the holding collar 430. Each locking arrangement 440 includes an outwardly extending sloped projection 441 near the longitudinal center (unnumbered) of the collar 430 and an outwardly extending squared projection 442 proximate the distal end 430a of the collar 430. The sloped face (unnumbered) of the sloped projection 441 facilitates insertion of the projection 441 into the slot 330 where the projection 441 snaps into the slot 330 for securing the blade assembly 400 in position proximate the bottom 302 of the hopper 300. The sloped projection 441 and the squared projection 442 define an outwardly open channel 443 between them for accepting the block of material 340 between the slot 330 and the bottom 302 of the hopper.

A pair of longitudinally elongated, diametrically opposed guiding slots 450 are provided at the periphery of the blade assembly 400 for engaging a pair of longitudinally elongated, diametrically opposed guiding fingers 350 on the inside of the hopper sidewall 303. The guiding slots 450 and fingers 350 cooperate to prevent attachment of the blade assembly 400 to the hopper 300 unless they are properly oriented with respect to one another.

The blade assembly 400 may be readily detached from the hopper 300 for permitting changing of the blade assembly 400 by simply forcing the distal end 430a of the collar 430 inward at the locking arrangements 440 until the sloped projections 441 of both locking arrangements 440 disengage the block of material 340 on the hopper 300.

The base 100, sleeve 200, hopper 300 and blade assembly 400 may be constructed from substantially any material possessing sufficient structural integrity including specifically, but not exclusively: plastics such as polyvinyl chloride, polycarbonate, nylon, and polyester; and metals such as steel and aluminum. Preferably the base 100, sleeve 200, hopper 300 and holding collar 430 of the blade assembly 400 are molded from plastics because of the low cost and durability of such materials. The blades 421,422, however, are preferably constructed from steel because of the substantial forces placed upon the blades 421,422. When the blades 421,522 are constructed of a metal, the longitudinal 421 and transverse 422 blades may be formed by simply pressing a metal sheet to project the desired cutting edges from the sheet.

The electric motor 110 is preferably a 7 to 8 inch-ounce torque output motor capable of rotating a potato 500 at about 50 to about 60 rpm against the blades 421,422.

The depth 422d of the transverse blade 422 controls the thickness of the spiral slices 500′ while the spacing 421w provided between the longitudinal blades 421 controls the width of the spiral slices 500′.

The entire appliance 10 can be constructed to substantially any desired size from about 0.25 to about 2 liters for slicing smaller fruits and vegetables in a household setting to about 0.5 to about 4 liters for slicing larger fruits and vegetables in a commercial setting. The appliance 10 only requires counter space of about 14 to about 18 cm: for the smaller units and about 18 to about 22 cm$^2$ for the larger units.

OPERATION

Use of the appliance 10 to slice a potato 500 simply requires the steps of (i) setting the base 100 upon a flat surface (not shown), (ii) plugging the cord 150 into an electric receptacle (not shown), (iii) securing the sleeve 200 upon the base 100 by aligning, inserting and rotating the L-shaped projection 115 on the base 100 into the L-shaped channel 241 on the sleeve 200, (iv) skewering the bottom 502 of a potato 500 onto the upwardly extending skewers 253 on the drive disc 250, (v) aligning the longitudinal rib pairs 320 on the hopper 300 with the longitudinal channels 220 in the sleeve 200, (vi) sliding the hopper 300 into the retention chamber 207 of the sleeve 200 until the centering pin 410 on the blade assembly 400 penetrates into the top 501 of the potato 500 and the top 501 of the potato 500 contacts the blades 421,422, (vii) applying downward pressure upon the hopper 300 by grasping the lateral tabs 310 on the hopper 300 and pushing or pulling the hopper 300 towards the base 100, and, (viii) rotating the potato 500 against the blades 421,422 while maintaining downward pressure upon the hopper 300 against the potato 500 by flicking switch 140 to the on position.

Continued downward movement of the hopper 300 within the retention compartment 207 of the sleeve 200 is prevented prior to contact between the stationary blade assembly 400 and the rotating drive disc 250. Accordingly, a bottom portion 502 of the potato 500 will generally remain unsliced within the retention compartment 207 after completion of the slicing operation.

Separability of the base 100, sleeve 200, hopper 300, and blade assembly 400 facilitates cleaning of the appliance 10 and reduces the possibility that the base 100 will be accidentally submersed in water.

The specification is provided to aid in the complete nonlimiting understanding of the invention. Since many variations and embodiments of the invention may be created without departing from the spirit and scope of the invention, the scope of the invention resides in the claims hereinafter appended.

I claim:

1. A vegetable cutter, comprising:
   a frame having an open end and defining a retention compartment,
   a container defining a retention chamber which is configured for reception within the retention compartment,
   a means for rotating a vegetable retained within the retention compartment,
   a blade assembly operably coupled to the container for slicing a vegetable retained within the retention compartment as the vegetable is rotated by the rotating means,
   wherein the sliced vegetable passes into the retention chamber defined by the container.

2. The cutter of claim 1 wherein the frame has an open top and the container is configured and arranged for telescoping insertion into the retention compartment through the top of the frame for contacting the vegetable with the blade assembly attached to the container.

3. The vegetable cutter of claim 1 wherein the frame is a sleeve.

4. The vegetable cutter of claim 3 wherein the sleeve, container, and rotating means are separate components which are readily connected and disconnected by hand so as to facilitate cleaning of the hopper and container separately from the rotating means.

5. The vegetable cutter of claim 1 wherein the container and blade assembly are separate components which are readily connected and disconnected by hand so as to facilitate changing of the blade assembly.

6. The vegetable cutter of claim 3 wherein (i) the rotating means includes a rotating portion rotatable about a longitudinal axis and a stationary portion, (ii) the sleeve and stationary portion of the rotating means are compatibly configured to provide for longitudinal mounting of the sleeve onto the rotating means such that the sleeve is prevented from rotating about the longitudinal axis, and (iii) the sleeve and container are compatibly configured so as to provide for reciprocating longitudinal insertion of the container into the retention compartment of the sleeve through the open end of the sleeve while preventing rotation of the container about the longitudinal axis while any portion of the container is inserted within the retention compartment.

7. The vegetable cutter of claim 6 wherein the sleeve defines at least one internally accessible longitudinal groove and the container includes as least one externally extending longitudinal rib operable for insertion into the longitudinal groove defined by the sleeve so as to prevent rotation of the container about the longitudinal axis.

8. The vegetable cutter of claim 3 wherein the sleeve and container have substantially the same longitudinal depth.

9. The vegetable cutter of claim 3 wherein the rotating means is an electrical motor retained within a motor housing with a rotating spindle longitudinally extending upward through the top of the motor housing.

10. The vegetable cutter of claim 9 further comprising (i) a drive disc with the retention compartment for skewering a vegetable, and (ii) a rotatable coupling joint extending through the base of the sleeve for rotatably coupling to the rotating spindle at a first longitudinal end and rotatably coupling to the drive disk at a second longitudinal end so as to provide for the transfer of rotational force from the spindle to the drive disc.

11. The vegetable cutter of claim 1 wherein the blade assembly is configured and arranged to produce helical slices.

12. A method of slicing a vegetable, comprising the steps of:
   placing a vegetable with a sleeve so as to delineate a top and a bottom of the vegetable,
   mounting the bottom of the vegetable upon a drive shaft retained within the sleeve,
   rotating the mounted vegetable about a vertical axis,
   contacting the top of the rotating vegetable with a blade assembly attached to a container which is telescopingly receivable within the sleeve,
   slicing the rotating vegetable with the blade assembly in a downwardly spiralling fashion starting from the top of the vegetable,
   transporting the sliced vegetable into the container positioned immediately above the rotating vegetable as the vegetable is being sliced.

13. A vegetable cutter, comprising:
   a frame having an open top and defining a retention compartment;
   a container defining a retention chamber which is configured for reception within the retention compartment;
   a means for rotating a vegetable retained within the retention compartment;
   a blade assembly operably coupled to the container for slicing a vegetable retained within the retention compartment as the vegetable is rotated by the rotating means,
   wherein the sliced vegetable passes into the retention chamber defined by the container.

14. The vegetable cutter of claim 13, wherein the container is configured and arranged for telescoping insertion into the retention compartment through the open top of the frame for contacting the vegetable with the blade assembly attached to the container.

15. The vegetable cuter of claim 13, wherein the frame is a sleeve and (i) the rotating means includes a rotating portion rotatable about a longitudinal axis and a stationary portion, (ii) the sleeve and stationary portion of the rotating means are compatibly configured to provide for longitudinal mounting of the sleeve onto the rotating means such that the sleeve is prevented from rotating about the longitudinal axis, and (iii) the sleeve and container are compatibly configured so as to provide for reciprocating longitudinal insertion of the container into the retention compartment of the sleeve through the open top of the sleeve while preventing rotation of the container about the longitudinal axis while any portion of the container is inserted within the retention compartment.

* * * * *

UNITED STATES PATENT AND TRADEMARK OFFICE
CERTIFICATE OF CORRECTION

PATENT NO. : 5,089,286
DATED : February 18, 1992
INVENTOR(S) : Geissler et al

It is certified that error appears in the above-indentified patent and that said Letters Patent is hereby corrected as shown below:

On the title page: Item [75] Inventors: should read
    DELETE "Rodger" and INSERT therefor --Roger--.

Column 2, line 39
    DELETE "an" and INSERT therefor --a--.

Column 3, line 39
    DELETE "552" and INSERT therefor --442--.

Column 5, line 13
    DELETE "maintaining" and INSERT therefor
    --maintain--.

Column 5, line 36
    DELETE "longitudinal" and INSERT therefor
    --longitudinally--.

UNITED STATES PATENT AND TRADEMARK OFFICE
CERTIFICATE OF CORRECTION

PATENT NO. : 5,089,286

DATED : February 18, 1992

INVENTOR(S) : Geissler et al

Page 2 of 2

It is certified that error appears in the above-indentified patent and that said Letters Patent is hereby corrected as shown below:

Column 5, line 64
   INSERT --a-- after the word "in".

Column 6, line 29
   DELETE "522" and INSERT therefor --422--.

Column 6, line 47
   DELETE "18cm" and INSERT therefor --18cm$^2$--.

Column 8, line 22 (claim 12)
   DELETE "with" and INSERT therefor --within--.

Signed and Sealed this

Third Day of August, 1993

Attest:

MICHAEL K. KIRK

*Attesting Officer*        *Acting Commissioner of Patents and Trademarks*